(12) United States Patent
Wuhrmann et al.

(10) Patent No.: US 12,436,005 B2
(45) Date of Patent: Oct. 7, 2025

(54) SYSTEM FOR OPERATING A PHYSICAL MEASURING CHAIN

(71) Applicant: Kistler Holding AG, Winterthur (CH)

(72) Inventors: Thomas Wuhrmann, Frauenfeld (CH); Martin Stierli, Waedenswil (CH); Josua Hunziker, Taegerwilen (CH)

(73) Assignee: Kistler Holding AG, Winterthur (CH)

( * ) Notice: Subject to any disclaimer, the term of this patent is extended or adjusted under 35 U.S.C. 154(b) by 301 days.

(21) Appl. No.: 18/184,032

(22) Filed: Mar. 15, 2023

(65) Prior Publication Data

US 2023/0296415 A1   Sep. 21, 2023

(30) Foreign Application Priority Data

Mar. 21, 2022 (EP) .................................... 22163281

(51) Int. Cl.
| | |
|---|---|
| *G01D 9/32* | (2006.01) |
| *G01D 5/18* | (2006.01) |
| *G01D 9/10* | (2006.01) |
| *G01D 15/06* | (2006.01) |

(52) U.S. Cl.
CPC .............. *G01D 9/32* (2013.01); *G01D 5/185* (2021.05); *G01D 9/10* (2013.01); *G01D 15/06* (2013.01)

(58) Field of Classification Search
CPC ............ G01D 9/32; G01D 5/185; G01D 9/10; G01D 15/06; G01D 9/005; G01D 21/00; G01L 1/16; G01L 1/26
See application file for complete search history.

(56) References Cited

U.S. PATENT DOCUMENTS

| | | | | |
|---|---|---|---|---|
| 7,366,624 B2 * | 4/2008 | Wobschall | ............. | G01D 3/022 73/1.06 |
| 2005/0248456 A1 * | 11/2005 | Britton | ............... | G08B 13/2462 340/506 |

(Continued)

FOREIGN PATENT DOCUMENTS

| | | |
|---|---|---|
| DE | 2855746 A1 | 6/1980 |
| DE | 102012101181 A1 | 8/2013 |

OTHER PUBLICATIONS

The European Search Report English translation for application No. EP22163281.3, 4 pages.

*Primary Examiner* — Nay Tun
(74) *Attorney, Agent, or Firm* — Dority & Manning, P.A.

(57) ABSTRACT

A system for operating a physical measuring chain includes a plurality of physical measuring components at a measuring location. Each of the physical measuring components includes at least one physical sensor, at least one physical transmission means and at least one physical evaluation unit. An identification code is detected of each physical measuring component, and a data network transmits detected identification codes to a data processing unit located remote from the measuring location. The data processing unit includes at least one software and measuring component data. The software reads out measuring component data for transmitted identification codes and thereby generates a digital measuring chain including at least one digital sensor, at least one digital transmission means and at least one digital evaluation unit and the data network transmits the digital measuring chain to a computer unit at the measuring location.

18 Claims, 1 Drawing Sheet

(56) References Cited

U.S. PATENT DOCUMENTS

| | | | |
|---|---|---|---|
| 2013/0328697 A1* | 12/2013 | Lundy | G08C 17/02 340/870.01 |
| 2014/0107940 A1* | 4/2014 | Altendorf | G01N 21/39 702/24 |
| 2019/0257676 A1* | 8/2019 | Hung | G01S 15/931 |
| 2021/0326030 A1 | 10/2021 | Angliker et al. | |
| 2021/0333134 A1 | 10/2021 | Schaad et al. | |
| 2021/0336629 A1 | 10/2021 | Fortney | |

* cited by examiner

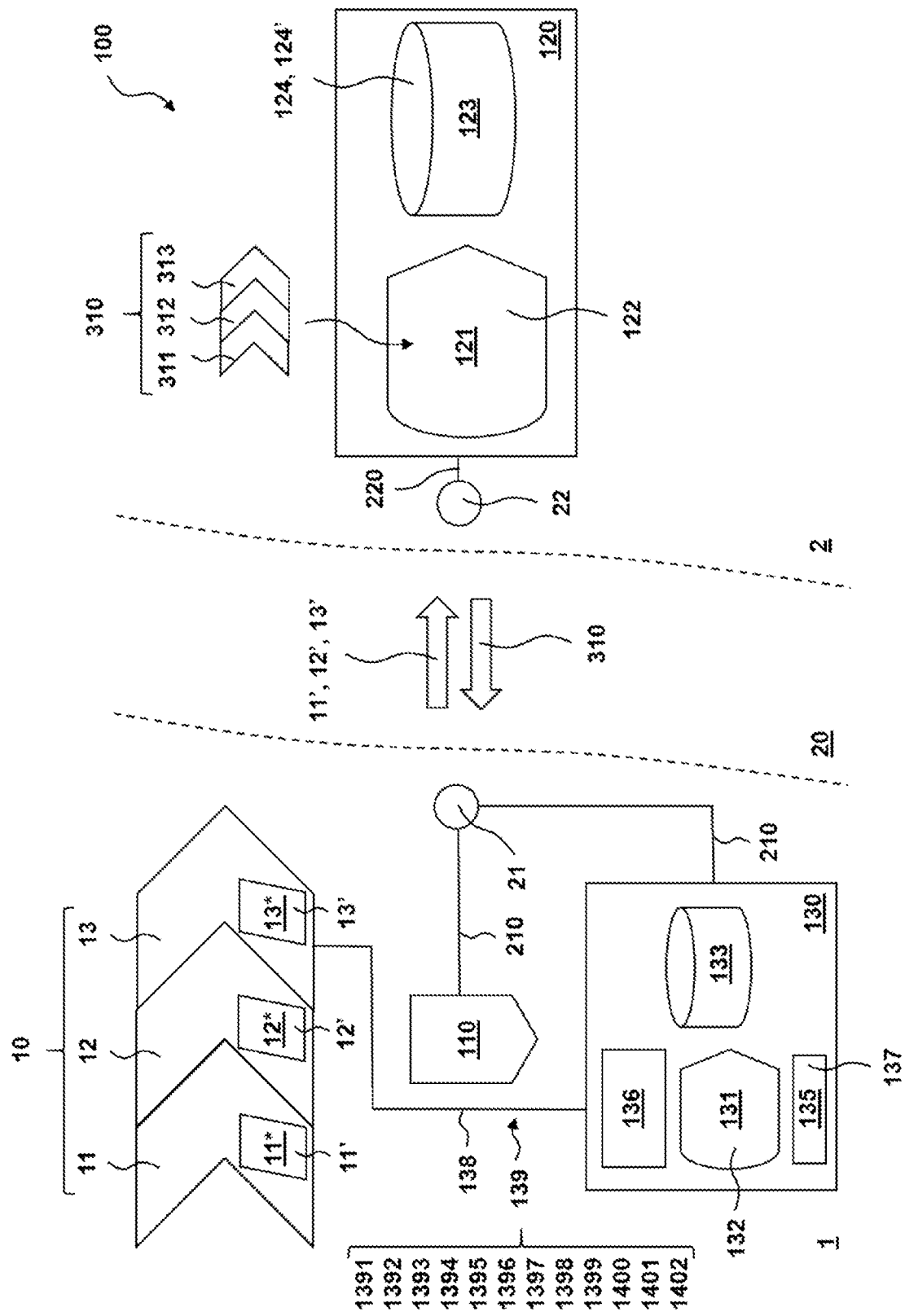

SYSTEM FOR OPERATING A PHYSICAL MEASURING CHAIN

FIELD OF THE INVENTION

The invention relates to a system for operating a physical measuring chain that includes displaying process parameters in windows of a graphical user interface.

BACKGROUND OF THE INVENTION

The document WO2019105693A1, which corresponds to US Patent Application Publication No. 2021-0333134 and is hereby incorporated in its entirety herein for all purposes by this reference, relates to a physical measuring chain for measuring a physical measurand. The physical measurand may be a force, a weight, a temperature, etc. The physical measuring chain comprises a plurality of physical measuring components such as a physical sensor, a physical transmission means, and a physical evaluation unit. To illustrate the mode of operation of the physical measuring chain, the measurement of the temperature at a measuring location is described as an example. For this purpose, the physical sensor in the form of a thermocouple is arranged at the measuring location and measures the temperature as an electrical voltage. The electrical voltage is transmitted as a measurement signal via the physical transmission means that has the form of a signal cable to the physical evaluation unit. The physical evaluation unit electrically amplifies the measurement signal and represents it on a display as a measured value. Directly adjacent physical measuring components of the physical measuring chain have a cause-and-effect relationship to each other for the measurement of the physical measurand.

Before a measurement of the physical measurand can take place, the physical measuring chain has to be configured. The noun "configuration" is used to describe the technical adaptation of the physical measuring components to each other. For this purpose configuration parameters are used. To stay with the example of the temperature measurement at the measuring location, in this case there are different types of thermocouples that measure the temperature with different sensitivity. Depending on the sensitivity, the measured electrical voltage is different. Furthermore, the signal cable may be of different lengths which leads to different voltage drops of the measurement signal in the signal cable. Finally, the amplification of the measurement signal in the physical evaluation unit must also be adapted to the sensitivity of the thermocouple used. The physical measuring chain can accurately measure the physical measurand only in the case when the various configuration parameters of the physical measuring chain are matched to each other in a technically correct manner.

However, such a technically correct configuration of the physical measuring chain is associated with time and material effort for the user of the physical measuring chain. This is because the technical documents specifying the required configuration parameters of the individual physical measuring components are often stored at various places by the user and are difficult to find. Also, the cause-and-effect relationship of the physical measuring components to each other, and thus also the influence of the configuration parameters, is not properly understood by the user in many cases. Finally, the configuration parameters have to be imported via a configuration software. If the user enters the configuration parameters manually via a keyboard there is a risk of typing errors. Altogether this means that any misconfiguration of the physical measuring chain will result in an incorrect measurement of the physical measurand.

OBJECTS AND SUMMARY OF THE INVENTION

It is an object of the present invention to help the user of the physical measuring chain to carry out the correct configuration of the physical measuring chain, so that the user can achieve the technically correct configuration of the physical measuring chain with little time and material effort, and so that the user does not run the risk of misconfiguring the physical measuring chain.

This object and others are solved by the features described below.

The invention relates to a system for operating a physical measuring chain, which physical measuring chain is adapted to measure a physical measurand at a measuring location; which physical measuring chain comprises a plurality of physical measuring components, which physical measuring components are in a cause-and-effect relationship to each other; which physical measuring components comprise at least one physical sensor, at least one physical transmission means and at least one physical evaluation unit; wherein each physical measuring component comprises an identifier with an identification code stored therein; wherein said system comprises at least one identification means, which identification means is located at the measuring location and is adapted to detect from each physical measuring component the identification code stored in the identifier; wherein the system comprises at least one data processing unit, which data processing unit is located at a data processing location remote from the measuring location; wherein the system comprises a data network, which data network transmits the detected identification codes to the data processing unit; wherein the data processing unit comprises at least one data processor having at least one software and at least one data memory with measuring component data; wherein the software is designed to read out measuring component data from the data memory for transmitted identification codes and to generate a digital measuring chain with the read-out measuring component data; wherein the digital measuring chain comprises a plurality of digital measuring components, which digital measuring components comprise at least one digital sensor, at least one digital transmission means and at least one digital evaluation unit; and wherein the system comprises at least one computer unit which is arranged at the measuring location, wherein said data network transmits the digital measuring chain to the computer unit.

According to the present invention, a digital measuring chain is generated by a data processing unit at a data processing location remote from the measuring location of a physical measuring chain present at the user's measuring location. The procedure is exceptionally user-friendly. At the measuring location, it is only necessary to capture identification codes from the individual physical measuring components and to transmit them to the data processing unit. This is all that's required. The identification codes are used to read out measuring component data stored in a data memory in the data processing unit, and the measuring component data is used to generate the digital measuring chain. The digital measuring chain is then transmitted to a computer unit at the measuring location. The transmitted digital measuring chain and its digital measuring components are a digital representation of the physical measuring chain containing the physical measuring components at the site of the user. This makes it easy for the user to configure the physical measuring chain in a technically correct manner because the digital measuring chain also provides the user with all the required configuration parameters.

Advantageous embodiments of the invention are described herein.

In an advantageous embodiment, each physical measuring component comprises a Transducer Electronic Data Sheet in accordance with the standard 1451 of the Institute of Electronic Engineers (IEEE), hereafter TEDS, as an identifier; wherein the identification means of each physical measuring component automatically detects the identification code stored in the TEDS; wherein the data network automatically transmits the detected identification codes to the data processing unit; wherein the software is designed to automatically read out measuring component data from the data memory for transmitted identification codes and to automatically generate a digital measuring chain with the read-out measuring component data; and wherein the data network automatically transmits the digital measuring chain to the computer unit.

A TEDS comprises a data memory with an identification code stored therein, which is automatically detectable by the identification means according to standard IEEE 1451. The adverb "automatically" is to be understood as meaning that the system automatically operates without having the user operating at the measuring location or a human operator at the data processing site. Now, when each physical measuring component comprises a TEDS the identification means can automatically acquire the identification codes of all physical measuring components, and further the transmission of the acquired identification codes to the data processing unit and reading out of the measuring component data and the generation of the digital measuring chain with the read-out measuring component data can also be performed in an automatic manner. Finally, the digital measuring chain thus generated is also automatically transmitted to the computer unit. This automatic provision of the digital measuring chain makes it particularly easy for the user to configure the physical measuring chain in a technically correct manner.

In an advantageous embodiment, the computer unit comprises at least one computer data processor comprising at least one computer software and at least one computer input means; wherein at least one operating point can be entered via the computer input means; wherein the computer software is designed to automatically extract at least one configuration parameter from the transmitted digital measuring chain for the operating point entered.

In a further simplification of the technically correct configuration of the physical measuring chain, a configuration parameter is automatically extracted from the digital measuring chain and provided to the user.

In an advantageous embodiment, the computer software is designed to automatically configure the physical measuring chain by using the configuration parameter.

Thus, the system automatically performs the technically correct configuration of the physical measuring chain for the user.

BRIEF DESCRIPTION OF THE DRAWING

In the following, the invention is explained in more detail by way of example with reference to the only FIGURE, namely, FIG. 1, which schematically shows a representation of a system 100 for operating a physical measuring chain 10.

DETAILED DESCRIPTION OF EXEMPLARY EMBODIMENTS

FIG. 1 schematically shows a physical measuring chain 10. The physical measuring chain 10 is used by a user. The physical measuring chain 10 is designed to measure a physical measurand at a measuring location 1. The measuring location 1 may be any location at which a research laboratory, a factory hall, a vehicle, etc. is located. A boundary of the measuring location 1 is shown in FIG. 1 as a dashed curved line. The physical measurand may be a force, weight, temperature, etc.

The physical measuring chain 10 comprises a plurality of physical measuring components 11, 12, 13. The adjective "physical" emphasizes that the measuring components 11, 12, 13 are present in an objective, tangible manner. Directly adjacent physical measuring components 11, 12, 13 are in a cause-and-effect relationship to each other. The physical measuring components 11, 12, 13 comprise at least one physical sensor 11, at least one physical transmission means 12 and at least one physical evaluation unit 13.

The physical sensor 11 may be a pressure sensor, an acceleration sensor, a temperature sensor, etc. Accordingly, the physical sensor 11 measures a pressure, an acceleration, a temperature, etc. as a physical measurand and generates a measurement signal such as an electric current, an electric voltage, etc. for the measured physical measurand.

For a physical sensor 11 in the embodiment of a piezoelectric sensor or a piezoresistive sensor, the measurement signal is proportional to the physical measurand.

The piezoelectric sensor generates an electric charge quantity as a measurement signal. The measurement sensitivity of the piezoelectric sensor is very high and is several pC/N. However, the measurement sensitivity changes with the ambient temperature and age of the piezoelectric sensor. In addition, the measurement signal is only approximately proportional to the physical measurand, and the linearity deviation from proportionality of the piezoelectric sensor or piezoresistive sensor is typically 1% of the full scale output (FSO). Finally, piezoelectric sensors have to be mechanically preloaded by a preload force. However, the sensitivity of the piezoelectric sensor changes depending on the magnitude of the preload force. Furthermore, the magnitude of the preload force also changes with temperature due to different expansion coefficients of the components of the piezoelectric sensor involved in the mechanical preload.

The piezoresistive sensor uses a bridge circuit comprising silicon-based bridge resistors. The physical measurand leads to strain in the bridge circuit, thus changing an electrical resistance of the bridge circuit. The measurement signal is an electrical voltage. The strain may be an axial strain, a bending strain, a shear strain, etc. Usually, the piezoresistive sensor comprises several bridge circuits that can be combined with each other. The bridge circuits may be full bridges, half bridges or quarter bridges. When the physical measurand to be measured is known a specific combination of bridge circuits may be selected which, for example, only measure axial strain but not bending strain. The change in temperature has an influence on the measurement signal. To compensate for the temperature dependence, a measurement signal from a bridge circuit that does not measure the physical measurand may be evaluated in addition to the measurement signal from the bridge circuit that measures the physical measurand.

In contrast to the piezoresistive sensor, a piezoelectric sensor is able to measure a rapidly changing physical quantity up to a cut-off frequency of 100 kHz. The cut-off frequency is substantially determined by the natural frequency of the piezoelectric sensor which may be up to 500 kHz. The closer the measurement frequency approaches the natural frequency, the stronger is the disturbing influence of the natural frequency caused by resonance on the measurement signal. The measuring range of the piezoelectric sensor is significantly broader than that of the piezoresistive sensor.

In contrast to the piezoelectric sensor, a piezoresistive sensor does not exhibit charge drift and is able to measure a physical quantity that exhibits small changes over time over long periods of time.

The physical transmission means 12 may be a signal cable, a radio communication, etc. The physical transmission means 12 transmits the measurement signal from the physical sensor 11 to the physical evaluation unit 13. For piezoelectric sensors and for a physical transmission means 12 in the embodiment of a signal cable, the cable length, cable capacitance and cable inductance significantly influence the upper frequency limit of the measurement of the physical measured value. As the measurement frequency increases, the inductive resistance increases and the capacitive resistance of the signal cable decreases so that the signal cable forms a low-pass filter which no longer transmits the measurement frequency above an upper cut-off frequency. The cable impedance of a signal cable also has an influence on the measurement signal. Especially if the signal cable is not terminated with a characteristic impedance, the cable impedance at the input of the signal cable will change.

The physical evaluation unit 13 evaluates the transmitted measurement signal. For this purpose, the physical evaluation unit 13 may comprise at least one electrical amplifier, at least one data processor, at least one data memory, and at least one output means. The electrical amplifier is able to electrically amplify the transmitted measurement signal. For evaluating the measurement signal of a piezoelectric sensor, the physical evaluation unit 13 comprises a charge amplifier. The charge amplifier converts the electrical charge quantity into an electrical voltage. Due to the finite magnitude of the insulation resistance of the physical measuring chain 10 up to the charge amplifier the measurement signal will drift over time, the value of the measurement signal will be falsified, which is referred to as charge drift. To compensate for the charge drift, a time constant of the charge amplifier may be reduced.

However, the time constant of the charge amplifier must also be dimensioned sufficiently high so as not to form a high-pass filter that no longer transmits the measurement frequency above a lower cut-off frequency. The electrical amplifier is also able to digitize the transmitted measurement signal. For evaluation of the digitized measurement signal, at least one software is stored in the data processor. The evaluation of the digitized measurement signal may comprise a calculation, filtering, etc. The digitized measurement signal can be stored in the data memory. Furthermore, the digitized measurement signal can be displayed on the output means such as a screen.

A person skilled in the art with knowledge of the present invention can implement variations of the physical measuring chain 10:

Thus, he/she can minimize the length of the physical transmission medium 12 to zero and link the physical evaluation unit 13 directly to the physical sensor 11.

The person skilled in the art can also implement the physical evaluation unit 13 as consisting of several parts wherein an electrical amplifier of a first physical evaluation unit 13 is integrated into the physical sensor 11 and the physical sensor 11 is connected via a physical transmission means 12 to a data processor and a data memory of a second physical evaluation unit 13. For a piezoelectric sensor that comprises an integrated charge amplifier (Integrated Electronics Piezo-Electric or IEPE), the measurement signal then is an electrical voltage. The integrated charge amplifier is supplied with an electric current of several mA via the physical transmission means 12. For a physical transmission means 12 in the embodiment of a signal cable having a cable capacitance, the magnitude of the electrical power supply will influence the upper cut-off frequency of the physical measuring chain 10. The higher is the electrical power supply, the higher will be the upper cut-off frequency.

In addition, the person skilled in the art can also implement the physical transmission means 12 as consisting of several parts wherein the physical sensor 11 is connected via a first physical transmission means 12 to an electrical amplifier of a first physical evaluation unit 13 and the first physical evaluation unit 13 is connected via a second physical transmission means 12 to a data processor and a data memory of a second physical evaluation unit 13.

Each physical measuring component 11, 12, 13 comprises an identifier 11*, 12*, 13*. The identifier 11*, 12*, 13* stores an identification code 11', 12', 13'. The identification code is an alphanumeric string and is used to uniquely identify the physical measuring component 11, 12, 13 which comprises the identifier 11*, 12*, 13*. The identifier 11*, 12*, 13* may be a two-dimensional code (2D code), an optical character recognition (OCR), a Radio Frequency Identification (RFID), a Transducer Electronic Data Sheet (TEDS) according to the Institute of Electrical and Electronics Engineers (IEEE) standard 1451, etc.

Thus, the physical sensor 11 in the embodiment of a piezoelectric sensor may comprise an identifier 11* that is embodied as a TEDS. A TEDS comprises a data memory with an identification code 11' stored therein which is electronically detectable according to standard IEEE 1451.

The physical transmission means 12 in the embodiment of a signal cable may comprise a cable sheath on which is applied an identifier 12* in the embodiment of a 2D code. The 2D code stores an optically detectable identification code 12'.

The physical evaluation unit 13 may comprise an evaluation unit housing with an identifier 13* applied thereon in the embodiment of an RFID. An identification code 13' that can be detected via radio frequencies is stored in the RFID.

The system 100 comprises at least one identification means 110, at least one data processing unit 120, and at least one computer unit 130. The identification means 110, data processing unit 120 and computer unit 130 are also referred to hereinafter as system components 110, 120, 130.

The system 100 also comprises a data network 20. The data network 20 transmits data between the system components 110, 120, 130. To this end, each system component 110, 120, 130 comprises an electronic interface 210, 220 through which the system component 110, 120, 130 can feed data into the data network 20 and receive data from the data network 20. The data network 20 is a non-proprietary data network such as the Internet. The transmission of data occurs using a protocol such as the Internet Protocol (IP). Each system component 110, 120, 130 comprises a unique IP address. The IP addresses are known to the system components 110, 120, 130. Thus, a data feeding system component 110, 120, 130 can transmit data on the data network 20 to a data receiving system component 110, 120, 130 by specifying the IP address of the data receiving system component 110, 120, 130. The data network 20 comprises a plurality of subnets and a plurality of routers 21, 22. Each subnet comprises at least one router 21, 22. The routers 21, 22 organize data transmission between subnets. Each system device 110, 120, 130 has access to one of the routers 21, 22 via its electronic interface 210, 220 and is located in the subnet of said router 21, 22. In FIG. 1, the identification device 110 and the computer unit 130 have access to a router 21 at the measuring location 1 via an electronic interface 210 and are located in the subnet of the router 21. The data processing unit 120 has access to a router 22 at the data processing location 2 via an electronic interface 220 and is located in the subnet of the router 22. The electronic interface 210, 220 may be wired or wireless.

The identification means 110 is located at the measuring location 1. The identification means 110 is adapted to detect the identification code 11', 12', 13' stored in the identifier 11*, 12*, 13* from each physical measuring component 11, 12, 13. The identification means 110 is as diverse as the identification code 11', 12', 13' to be detected. The identification means 110 may be a wired data reader, a camera, a radio-linked data reader, etc.

For detecting the identification code 11' stored in the identifier 11* that is embodied as a TEDS, the identification means 110 may be a wired data reader that may be connected to the TEDS via a signal cable and reads the identification code 11' stored in the TEDS.

For detecting the identifier 12* in the embodiment of a 2D code applied to the cable sheath, the identification means 110 may be a camera that scans the 2D code and detects the identification code 12' stored in the 2D code.

For detecting the identifier 13* in the embodiment of an RFID applied to the evaluation unit housing with an identifier code 13' stored therein, the identification means 110 may be a radio-linked data reader comprising an antenna that generates a high-frequency alternating electromagnetic field via the antenna and activates the RFID by electrical energy. The activated RFID modulates the high-frequency electromagnetic alternating field and thus transmits the identification code 13' to the antenna.

The identification means 110 may be a stand-alone device. However, the identification means 110 may also be integrated into the physical evaluation unit 13 or into the computer unit 130.

Preferably, each physical measuring component 11, 12, 13 comprises a TEDS as an identifier 11*, 12*, 13*. The identification means 110 automatically detects the identification code 11', 12', 13' stored in the TEDS. Thus, the identification means 110 may be integrated in the physical evaluation unit 13 and may automatically detect the identification codes 11', 12' stored in the TEDS of the physical sensor 11 and the physical transmission means 12 via the physical transmission means 12 in the embodiment of a signal cable. Since the identification means 110 is integrated in the physical evaluation unit 13, it is also able to automatically detect the identification code 13' stored in the TEDS of the physical evaluation unit 13.

The identification means 110 has access to the router 21 at the measuring location 1 via its electronic interface 210 and is located in the subnet of the router 21 at the measuring location 1. The identification means 110 feeds the captured identification codes 11', 12', 13' into the data network 20 via its electronic interface 210 and the router 21 at the measuring location 1.

The data network 20 transmits the captured identification codes 11', 12', 13' as data to the router 22 at the data processing site 2. The data processing unit 120 receives the data from the router 22 via its electronic interface 220. The data processing location 2 is remote from the measuring location. The term "remote from the measuring location" means that the data processing unit 120 is not in the subnet of the router 21 at the measuring location 1 at the user. In FIG. 1, a boundary of the data processing location 2 is shown as a dashed curved line. Preferably, the data network 20 automatically transmits the captured identification codes 11', 12', 13' to the data processing unit 120.

The data processing unit 120 comprises at least one data processor 121 having at least one software 122 and at least one data memory 123 containing measuring component data 124.

The measuring component data 124 are product-specific data of at least one manufacturer of physical measuring components 11, 12, 13 that are specific for the physical measuring components 11, 12, 13 produced by it. A very large number of measuring component data 124 are stored in the data memory 123. The measuring component data 124 are continuously updated and form a complete database of produced physical measuring components 11, 12, 13. Each data element of the measuring component data 124 has a product number 124'. The product number 124* identifies the data element for a physical measuring component 11, 12, 13 in the data memory 123. The product number 124* corresponds to a transmitted identification code 11', 12', 13'. For a transmitted identification code 11', 12', 13', measuring component data 124 in the data memory 123 can thus be identified via the product number 124'.

For a physical sensor 11, the measuring component data 124 includes at least one of the following data elements, preferably all of the following data elements:
Data elements concerning the temperature range of the measuring component 124 in which the measuring component 124 can be operated.
Data elements concerning the weight the measuring component 124.
Data elements concerning the external dimensions of the measuring component 124.
Data elements concerning materials which the measuring component 124 is made of.

For a physical sensor 11, the measuring component data 124 includes at least one of the following data elements, preferably all of the following data elements:
Data elements concerning the physical measurand which is measured by the physical sensor 11.
Data elements concerning the measuring ranges in which the physical sensor 11 measures the physical measurand. If the measuring range is too small for the measurement signal, there will be a risk that the measurement signal will exceed the full scale value and the physical sensor 11 will be damaged. If the measuring range is too large for the measurement signal, the measurement signal will be poorly resolved.
Data elements concerning the permissible maximum value of the physical measurands measured by the physical sensor 11.
Data elements concerning sensitivities by which the physical sensor 11 measures the physical measurand in different measuring ranges.
Data elements concerning the repeatability by which the physical sensor 11 measures the physical measurand.
Data elements concerning the values of the linearity deviation including the hysteresis by which the physical sensor 11 measures the physical measured value. The values of the linearity deviation including hysteresis for a measurement with an ascending physical measured value are different from those of a measurement with a descending physical measured value. The values of the linearity deviation including the hysteresis can be represented graphically as a function of the full scale value as a hysteresis loop.

Data elements concerning calibration data of the physical sensor 11 where for different measurement ranges the smallest measurement inaccuracy prevailing therein is documented.

Data elements concerning the type of connection to the signal cable.

If the physical sensor 11 is a piezoelectric sensor, the measuring component data 124 will include at least one of the following data elements, preferably all of the following data elements:

Data elements concerning the natural frequency of the physical sensor 11.

In order to keep the disturbing influence of the natural frequency caused by resonance of the physical sensor 11 on the measurement of the physical measurand at about 5%, the cut-off frequency of the measurement of the physical measurand is 20% of the natural frequency of the physical sensor 11.

Data elements concerning temperature coefficients of the sensitivity of the piezoelectric sensor. Usually the temperature coefficients of the sensitivity of the piezoelectric sensor are factors which are effective in certain sections of the temperature range of the piezoelectric sensor. For a physical measurand measured in a particular section of the temperature range, the measurement signal generated for the physical measured value is multiplied by a factor corresponding to the particular section of the temperature range. However, the data elements concerning temperature coefficients of the sensitivity of the piezoelectric sensor preferably are a mathematical series expansion. The mathematical series expansion represents the temperature coefficient of the sensitivity in the temperature range of the piezoelectric sensor by an order of magnitude more accurately than the factors usually specified.

Data elements concerning magnitudes of the preload force of the piezoelectric sensor. Typically, the magnitude of the preload force varies in the range from 20% to 70% of the full scale value of the selected measuring range.

Data elements concerning the sensitivity of the piezoelectric sensor as a function of the magnitude of its preload force. The preload causes a force shunt, a part of the physical measurand to be measured no longer passes through the piezoelectric sensor and the sensitivity of the piezoelectric sensor decreases. The relationship between the decrease in sensitivity and the magnitude of the preload force is not linear.

For a physical transmission means 12 in the embodiment of a signal cable, the measuring component data 124 comprise at least one of the following data elements, preferably all of the following data elements:

Data elements concerning the length of the signal cable.
Data elements concerning the cable capacity of the signal cable.
Data elements concerning the cable inductance of the signal cable.
Data elements concerning the type of connection to the physical sensor 11.
Data elements concerning the type of connection to the physical evaluation unit 13.

For a physical transmission means 12 in the embodiment of a radio link, the measuring component data 124 comprise at least one of the following data elements, preferably all of the following data elements:

Data elements concerning the number of transmission channels.
Data elements concerning the bandwidth of the individual transmission channels.

For a physical evaluation unit 13, the measuring component data 124 comprise at least one of the following data elements, preferably all of the following data elements:

Data elements concerning the number of channels by which the physical evaluation unit 13 receives measurement signals.
Data elements concerning the measuring ranges in which the physical evaluation unit 13 represents measurement signals.
Data elements concerning the magnitude of the crosstalk between channels of the physical evaluation unit 13.
Data elements concerning the input-related noise of the physical evaluation unit 13.
Data elements concerning the resolution by which the physical evaluation unit 13 represents the smallest possible change in the physical measurand.
Data elements concerning calibration data of the physical evaluation unit where the smallest measurement inaccuracy during the evaluation of the measurement signal is documented for various physical measurands.
Data elements concerning the type of connection to the signal cable.

If the physical sensor 11 is a piezoelectric sensor and if the physical evaluation unit 13 comprises a charge amplifier within the piezoelectric sensor, the measuring component data 124 will comprise data elements concerning the time constants of the charge amplifier.

If the physical sensor 11 is a piezoelectric sensor, if the physical evaluation unit 13 comprises a charge amplifier within the piezoelectric sensor, and if the physical transmission means 12 is a signal cable, the measuring component data 124 will comprise data elements concerning values of the electrical power supply to the charge amplifier via the signal cable.

The software 122 is loaded into the data processor 121. The software 122 loaded in the data processor 121 is adapted to read out measuring component data 124 from the data memory 123 for transmitted identification codes 11', 12', 13' and to generate a digital measuring chain 310 with the read-out measuring component data 124. The digital measuring chain 310 comprises a plurality of digital measuring components 311, 312, 313, which digital measuring components 311, 312, 313 comprise at least one digital sensor 311, at least one digital transmission means 312 and at least one digital evaluation unit 313. Preferably, for transmitted identification codes 11', 12', 13', the software 122 automatically reads out measuring component data 124 from the data memory 123 and automatically generates the digital measuring chain 310 with the read-out measuring component data 124.

The data processing unit 120 feeds the digital measuring chain 310 into the data network 20 via its electronic interface 220 and the router 22 at the data processing site 22.

The data network 20 transmits the digital measuring chain 310 as data to the router 21 located at the measuring location 1. The computer unit 130 receives the data from the router 21 via its electrical interface 210. Preferably, the data network 20 automatically transmits the digital measuring chain 310 to the computer unit 130.

The computer unit 130 comprises at least one computer data processor 131 comprising at least one computer software 132, at least one computer data memory 134, at least one computer input means 135, and at least one computer output means 136. The computer input means 135 is an electronic interface, a keyboard, a touch-sensitive screen, etc. The computer output means 136 is a display screen, etc.

The transmitted digital measuring chain 310 and its digital measuring components 311, 312, 313 are a digital representation of the physical measuring chain 10 comprising the physical measuring components 11, 12, 13 at the site of the user. The transmitted digital measuring chain 210 may be stored in the computer data memory 133 and may be visually output to the user on the computer output means 136.

At least one operating point 137 can be entered via the computer input means 13. The operating point 137 may be a physical measurand to be measured, such as a nominal force, a nominal acceleration, a nominal temperature, etc. The operating point 137 comprises at least one of the following data elements:
  A range of magnitudes of the operating point 137 between a smallest operating point 137 and a largest operating point 137.
  A frequency range of the operating point 137 between a slowest operating point 137 and a fastest operating point 137.
  A temperature range of the operating point 137 between a coldest operating point 137 and a warmest operating point 137.

The computer software 132 is loaded into the computer data processor 131. The computer software 132 loaded in the computer data processor 131 is configured to input the entered operating point 137 and to automatically extract at least one configuration parameter 139 from the transmitted digital measuring chain 310 for the entered operating point 137.

The configuration parameter 139 is used to technically adjust the physical measuring components 11, 12, 13 with respect to each other so that the physical measuring components 11, 12, 13 can accurately measure the operating point 137.

For a physical sensor 11, the configuration parameter 139 comprises at least one of the following data elements, preferably all of the following data elements:
  Data elements concerning a best measuring range 1392 of the physical sensor 11 wherein for the entered range of magnitudes of the operating point 137 the largest operating point 137 does not exceed the full scale value of the best measuring range 1392 and wherein further the physical sensor 11 still measures the smallest operating point 137 with the highest possible resolution.
  Data elements concerning a best value of the linearity deviation including hysteresis 1393 of the physical sensor 11 which is in the range of magnitudes of the operating point 137 for the highest possible resolution.
  Data elements concerning a best smallest measurement inaccuracy 1394 of the physical sensor 11 for the best measuring range 1392.

For a physical sensor 11 in the embodiment of a piezoelectric sensor, the configuration parameter 139 comprises at least one of the following data elements, preferably all of the following data elements:
  Data elements concerning a best temperature coefficient of the sensitivity 1395 of the piezoelectric sensor. The best temperature coefficient of the sensitivity 1395 is calculated from the mathematical series expansion and is valid in the temperature range of the operating point 137.
  Data elements concerning a best magnitude of the preload force 1396 of the piezoelectric sensor. For the highest possible resolution in the entered range of magnitudes of the operating point 137, the best magnitude of the preload force 1396 added to the largest operating point 137 is substantially equal to the full scale value of the best measuring range 1392.

For a physical evaluation unit 13, the configuration parameter 139 comprises at least one of the following data elements, preferably all of the following data elements:
  Data elements concerning a best sensitivity 1398 in the best measuring range 1392 of the physical sensor 11.
  Data elements concerning a best sensitivity 1399 in the best measuring range 1392 for the best magnitude of the preload force of the physical sensor 11.
  Data elements concerning a best smallest measurement inaccuracy 1400 of the physical evaluation unit 13 for the operating point 137.
  For a physical sensor 11 in the embodiment of a piezoelectric sensor, the configuration parameter 139 includes data elements concerning a best time constant 1391 of the charge amplifier which results in a smallest charge drift for the frequency range of the operating point 137.
  For a physical sensor 11 in the embodiment of a piezoelectric sensor, the configuration parameter 139 comprises data elements concerning a best time constant 1401 of the charge amplifier which does not result in a lower cut-off frequency in the frequency range of the operating point 137. This best time constant 1401 avoids a lower cut-off frequency in the frequency range of the operating point 137.
  For a physical sensor 11 in the embodiment of a piezoelectric sensor and for a physical evaluation unit 13 comprising a charge amplifier in the piezoelectric sensor and for a physical transmission means 12 in the embodiment of a signal cable, the configuration parameter 139 comprises data elements concerning a best electrical power supply 1402 of the charge amplifier which does not result in an upper frequency limit for the cable capacitance of the signal cable in the frequency range of the operating point 137.

A computer software 132 is adapted to automatically configure the physical measuring chain 10 by the configuration parameter 139. For this purpose, the computer unit 130 is connected to the physical evaluation unit 13 via a data transmission 138 such as Ethernet, Universal Serial Bus (USB), etc. Via the data transmission 138, the computer software 132 automatically sends the configuration parameter 139 to the physical evaluation unit 13. The physical evaluation unit 13 uses the transmitted configuration parameter 139 for measuring the operating point 137 by the physical measuring chain 10.

LIST OF REFERENCE NUMERALS 1 measuring location
2 data processing location
10 physical measuring chain
11 physical sensor
12 physical transmission means
13 physical evaluation unit
11*, 12*, 13*identifier
11', 12', 13' identification code 20 data network
21, 22 router
210, 220 electronic interface
100 system
110 identification means
120 data processing unit
121 data processor
122 software
123 data memory
124 measuring component data
124' product number
130 computer unit
131 computer data processor
132 computer software
133 computer data memory
135 computer input means
136 computer output means
137 operating point
138 data transmission
139 configuration parameter
1391 best time constant for smallest charge drift
1392 best measuring range
1393 best value of the linearity deviation including hysteresis
1394 best value of the smallest measurement inaccuracy of the physical sensor
1395 best temperature coefficient of the sensitivity
1396 best magnitude of the preload force
1397 best amount of channels
1398 best sensitivity in the best measuring range
1399 best sensitivity in the best measuring range for the best magnitude of the preload force
1400 best value of the smallest measurement inaccuracy
1401 best time constant for avoiding a lower cut-off frequency
1402 best electrical power supply
310 digital measuring chain
311 digital sensor
312 digital transmission means
313 digital evaluation unit

What is claimed is:

1. A system for operating a physical measuring chain that is designed to measure a physical measurand at a measuring location, the system comprising:
   a plurality of physical measuring components that are in a cause-and-effect relationship to each other;
   wherein each of the plurality of physical measuring components includes a respective identifier in which is stored a respective identification code;
   wherein the plurality of physical measuring components includes at least one physical sensor, at least one physical transmission means and at least one physical evaluation unit;
   at least one identification means, which identification means is arranged at the measuring location and is configured for detecting each respective identification code stored in the identifier from each physical measuring component;
   at least one data processing unit arranged at a data processing location remote from the measuring location, wherein the data processing unit includes at least one data processor, at least one software configured to run on the at least one data processor, and at least one data memory connected to the at least one data processor and wherein measuring component data is stored in the at least one data memory, wherein the software is designed to read out measuring component data from the data memory for the transmitted identification codes and to generate a digital measuring chain with the read-out measuring component data;
   a data network connected to the data processing unit and configured to transmit the detected identification code to the data processing unit;
   wherein the digital measuring chain includes a plurality of digital measuring components that include at least one digital sensor, at least one digital transmission means and at least one digital evaluation unit; and
   at least one computer unit which is arranged at the measuring location, wherein the data network is configured to transmit the digital measuring chain to the computer unit.

2. The system according to claim 1, wherein each respective identifier of each of the plurality of physical measuring components is a TEDS; wherein the identification means of each physical measuring component is configured to automatically detect the identification code stored in the TEDS; wherein the data network is configured to automatically transmit the detected identification codes to the data processing unit; wherein the at least one software is designed to automatically read out measuring component data from the at least one data memory for any TEDS that have been transmitted to the data processing unit and to automatically generate a digital measuring chain with the read-out measuring component data; and wherein the data network is configured to automatically transmit the digital measuring chain to the computer unit.

3. The system according to claim 2, wherein the computer unit includes at least one computer data processor that includes at least one computer software and at least one computer input means; wherein at least one operating point can be entered via the at least one computer input means; wherein the at least one computer software is designed to automatically extract at least one configuration parameter from the transmitted digital measuring chain for the at least one operating point entered.

4. The system according to claim 3, wherein the at least one operating point entered includes at least one of the following data elements:
   a range of magnitudes of the at least one operating point between a smallest operating point and a largest operating point;
   a frequency range of the at least one operating point between a slowest operating point and a fastest operating point;
   a temperature range of the at least one operating point between a coldest operating point and a warmest operating point.

5. The system according to claim 1, wherein the computer unit includes at least one computer data processor that runs at least one computer software and includes at least one computer input means; wherein at least one operating point can be entered via the computer input means; wherein the at least one computer software is designed to automatically extract at least one configuration parameter from the transmitted digital measuring chain for the at least one operating point entered.

6. The system according to claim 5, wherein the at least one operating point entered includes at least one of the following data elements:
   a range of magnitudes of the at least one operating point between a smallest operating point and a largest operating point;

a frequency range of the at least one operating point between a slowest operating point and a fastest operating point;

a temperature range of the at least one operating point between a coldest operating point and a warmest operating point.

7. The system according to claim 6, wherein the transmitted digital measuring chain includes measuring component data concerning measuring ranges of the physical sensor; wherein the at least one computer software is designed to extract a best measuring range of the at least one physical sensor from the measuring ranges of the at least one physical sensor as a configuration parameter for the entered range of magnitudes of the at least one operating point, in which best measuring range a largest operating point does not exceed the full scale value of the best measuring range and, furthermore, in which best measuring range the at least one physical sensor still measures a smallest operating point with the highest possible resolution.

8. The system according to claim 7, wherein the transmitted digital measuring chain includes measuring component data concerning sensitivities by which the at least one physical sensor measures the physical measurand in different measurement ranges; and wherein the at least one computer software is adapted to extract a best sensitivity in the best measurement range of the at least one physical sensor from the sensitivities of the at least one physical sensor as a configuration parameter.

9. The system according to claim 7, wherein the at least one physical sensor is a piezoelectric sensor; wherein the transmitted digital measuring chain includes measuring component data concerning magnitudes of the preload force of the piezoelectric sensor; and wherein the at least one computer software is designed to extract a best magnitude of the preload force of the piezoelectric sensor from the measuring component data that concern magnitudes of the preload force of the piezoelectric sensor for the entered range of magnitudes of the at least one operating point, which best magnitude of the preload force added to a largest operating point is substantially equal to the full scale value of a best measuring range.

10. The system according to claim 9, wherein the transmitted digital measuring chain includes measuring component data concerning sensitivities by which the at least one physical sensor is configured to measure the physical measured value at different magnitudes of the preload force; and wherein the at least one computer software is adapted to extract a best sensitivity at a best magnitude of the preload force of the at least one physical sensor from the sensitivities of the at least one physical sensor as a configuration parameter.

11. The system according to claim 7, wherein the transmitted digital measuring chain includes measuring component data concerning the smallest measurement inaccuracies prevailing in different measurement ranges of the at least one physical sensor and concerning the smallest measurement inaccuracies of the physical evaluation unit prevailing for different physical measurands; and wherein the at least one computer software is designed to extract from the smallest measurement inaccuracies of the at least one physical sensor prevailing in different measurement ranges and from the smallest measurement inaccuracies of the physical evaluation unit prevailing for different physical measurands a best smallest measurement inaccuracy of the at least one physical sensor and for the at least one operating point a best smallest measurement inaccuracy of the physical evaluation unit as configuration parameters for the best measurement range.

12. The system according to claim 6, wherein the at least one physical sensor is a piezoelectric sensor; wherein the transmitted digital measuring chain includes measuring component data concerning temperature coefficients of the sensitivity of the piezoelectric sensor; wherein the temperature coefficients of the sensitivity are a mathematical series expansion; and wherein the at least one computer software is adapted to extract a best temperature coefficient of the sensitivity of the piezoelectric sensor for the entered temperature range of the at least one operating point of the mathematical series expansion as a configuration parameter, which best temperature coefficient of the sensitivity is effective in the temperature range of the at least one operating point.

13. The system according to claim 6, wherein the transmitted digital measuring chain includes measuring component data concerning values of the linearity deviation including hysteresis of the at least one physical sensor; and wherein the at least one computer software is designed to extract a best value of the linearity deviation including hysteresis of the at least one physical sensor for the entered range of magnitudes of the at least one operating point from the values of the linearity deviation including hysteresis of the at least one physical sensor, which best value of the linearity deviation including hysteresis is in the range of magnitudes of the at least one operating point for the highest possible resolution.

14. The system according to claim 6, wherein the at least one physical sensor is a piezoelectric sensor; wherein the physical evaluation unit includes a charge amplifier in the piezoelectric sensor; wherein the transmitted digital measuring chain includes measuring component data concerning time constants of the charge amplifier; and the at least one computer software is designed to extract as a configuration parameter for the entered frequency range of the at least one operating point from the time constants of the charge amplifier a best time constant of the charge amplifier which results in a smallest charge drift for the frequency range of the at least one operating point.

15. The system according to claim 6, wherein the at least one physical sensor is a piezoelectric sensor; wherein the physical evaluation unit includes a charge amplifier in the piezoelectric sensor; wherein the transmitted digital measuring chain includes measuring component data concerning time constants of the charge amplifier; and wherein the computer software is designed to extract as a configuration parameter for the entered frequency range of the at least one operating point from the time constants of the charge amplifier a best time constant of the charge amplifier which does not result in a lower frequency limit in the frequency range of the at least one operating point.

16. The system according to claim 6, wherein the at least one physical sensor is a piezoelectric sensor; wherein the physical evaluation unit includes a charge amplifier in the piezoelectric sensor; wherein the physical transmission means is a signal cable; wherein the transmitted digital measuring chain includes measuring component data concerning magnitudes of the electrical power supply of the charge amplifier via the signal cable; and wherein the at least one computer software is designed to extract as a configuration parameter for the entered frequency range of the at least one operating point from the magnitudes of the electrical power supply of the charge amplifier via the signal cable a best magnitude of the electrical power supply of the charge amplifier via the signal cable which does not result in an upper frequency limit for the cable capacitance of the signal cable in the frequency range of the at least one operating point.

17. The system according to claim 6, wherein the at least one computer software is adapted to automatically configure the physical measuring chain by the configuration parameter.

18. The system according to claim 5, wherein the at least one computer software is adapted to automatically configure the physical measuring chain by the configuration parameter.

* * * * *